United States Patent
Baarman et al.

(10) Patent No.: US 8,598,721 B2
(45) Date of Patent: Dec. 3, 2013

(54) ENERGY HARVESTING SEATING

(75) Inventors: David W. Baarman, Fennville, MI (US); William T. Stoner, Jr., Ada, MI (US); David B. Fry, Holland, MI (US)

(73) Assignee: Access Business Group International LLC, Ada, MI (US)

( * ) Notice: Subject to any disclaimer, the term of this patent is extended or adjusted under 35 U.S.C. 154(b) by 86 days.

(21) Appl. No.: 13/091,398

(22) Filed: Apr. 21, 2011

(65) Prior Publication Data

US 2011/0260469 A1  Oct. 27, 2011

Related U.S. Application Data

(60) Provisional application No. 61/327,409, filed on Apr. 23, 2010.

(51) Int. Cl.
*H02K 7/06* (2006.01)

(52) U.S. Cl.
USPC .......................................... 290/1 R; 290/1 C

(58) Field of Classification Search
USPC .......................................................... 290/1 C
See application file for complete search history.

(56) References Cited

U.S. PATENT DOCUMENTS

| | | | |
|---|---|---|---|
| 6,700,310 B2 | 3/2004 | Maue et al. | |
| 7,368,827 B2 | 5/2008 | Kulkarni et al. | |
| 7,414,351 B2 | 8/2008 | Ulm et al. | |
| 7,528,698 B2 | 5/2009 | Mickle et al. | |
| 7,605,689 B2 | 10/2009 | Hein et al. | |
| 7,735,918 B2 | 6/2010 | Beck | |
| 7,762,583 B2 * | 7/2010 | Federspiel | 280/735 |
| 7,872,363 B2 | 1/2011 | Morse | |
| 2005/0242635 A1 * | 11/2005 | Cassaday | 297/217.3 |
| 2007/0137686 A1 | 6/2007 | Durling et al. | |
| 2008/0038061 A1 | 2/2008 | Morse | |
| 2008/0211684 A1 * | 9/2008 | Beck | 340/667 |
| 2009/0015022 A1 * | 1/2009 | Rome et al. | 290/1 A |
| 2009/0127862 A1 | 5/2009 | Sankrithi | |
| 2009/0127976 A1 | 5/2009 | Ward et al. | |

(Continued)

FOREIGN PATENT DOCUMENTS

| | | |
|---|---|---|
| CN | 2513448 | 10/2002 |
| CN | 2513448 Y * | 10/2002 |

(Continued)

OTHER PUBLICATIONS

Adee, Sally, Wireless Sensors That Live Forever (Energy harvesters and radioisotopes fuel tiny transmitters), IEEE Spectrum, Feb. 2010, downloaded from http://spectrum.ieee.org/semiconductors/devices/wireless-sensors-that-live-forever.

(Continued)

*Primary Examiner* — Tulsidas C Patel
*Assistant Examiner* — S. Mikailoff
(74) *Attorney, Agent, or Firm* — Warner Norcross & Judd LLP

(57) ABSTRACT

Seating systems in which energy is harvested from the physical movement of the seat. The seating system includes a seating article, an electrical generator, a drive mechanism, and a battery. The generator, the drive mechanism, and the battery are supported on the seating article. The generator is powered by the drive mechanism in response to movement of the user. For example, the drive mechanism may be responsive to the vertical movements of a seat.

3 Claims, 17 Drawing Sheets

(56) References Cited

U.S. PATENT DOCUMENTS

| | | | |
|---|---|---|---|
| 2009/0167110 A1 | 7/2009 | Berkean et al. | |
| 2009/0174289 A1 | 7/2009 | Tanner | |
| 2009/0195124 A1 | 8/2009 | Abramovich et al. | |
| 2009/0206803 A1 | 8/2009 | Gualtieri | |
| 2009/0207000 A1 | 8/2009 | Mickle et al. | |
| 2009/0216292 A1 | 8/2009 | Pless et al. | |
| 2010/0013241 A1* | 1/2010 | Yeh | 290/1 C |
| 2010/0026142 A1* | 2/2010 | Jones et al. | 310/339 |
| 2010/0045119 A1 | 2/2010 | Jackson et al. | |
| 2011/0012723 A1 | 1/2011 | Adamson et al. | |
| 2011/0022025 A1 | 1/2011 | Savoie et al. | |
| 2012/0146340 A1* | 6/2012 | Burke | 290/1 R |

FOREIGN PATENT DOCUMENTS

| | | | |
|---|---|---|---|
| CN | 201194658 | | 2/2009 |
| EP | 2065228 | | 6/2009 |
| EP | 2119621 | | 11/2009 |
| GB | 2471658 | | 1/2011 |
| JP | 2006237911 | | 9/2006 |
| JP | 2006237911 A | * | 9/2006 |
| WO | 2007106221 | | 9/2007 |
| WO | 2007131227 | | 11/2007 |
| WO | 2008030325 | | 3/2008 |
| WO | 2008124762 | | 10/2008 |
| WO | 2009123773 | | 10/2009 |

OTHER PUBLICATIONS

Yogen Charger for Life, downloaded on Mar. 6, 2011 from http://www.yogenstore.com/products.html.

June, Laura, Easy Energy Yogen Max foldable, man-powered laptop charger prototype complete, posted Dec. 4, 2008 2:57 p.m., downloaded from http://www.engadget.com/2008/12/04/easy-energy-yogen-max-foldable-man-powered-laptop-charger-proto/.

Toto, Serkan, Futuristic shoe generates electricity to run iPods, Oct. 20, 2008, downloaded from http://www.crunchgear.com/2008/10/20/futuristic-shoe-generates-electricity-to-run-ipods/.

Bourzac, Katherine, Flexible Sheets Capture Energy from Movement, Jan. 29, 2010, downloaded from http://www.technologyreview.com/energy/24428/?a=f.

Landau, Elizabeth, Tiny technologies could product big energy solutions, CNN, downloaded on Mar. 6, 2011 from http://www.cnn.com/2009/TECH/09/22/nano.technology.energy/index.html#cnnSTCText.

International Search Report and Written Opinion for International Application No. PCT/US2011/033418, mailed Sep. 28, 2011.

* cited by examiner

US 8,598,721 B2

ENERGY HARVESTING SEATING

BACKGROUND OF THE INVENTION

The present invention relates to energy-generating devices, and more particularly to devices that generate energy from the daily physical movements of people.

Seating can offer many options for users and can assist users in many ways when electrical power is available. Examples of electrically powered seating options include seat adjustment motors, lumbar inflatable bags, and simple heating and cooling. Seating can be difficult to power especially when it is mobile, as in the case of office furniture. Running power cords and cables to seating can be unsightly at best and unsafe at worst.

SUMMARY OF THE INVENTION

In the present invention, energy is harvested from the movement of a person in a seating article; and the harvested energy is converted to electrical energy. Energy harvesting is accomplished by translating physical motions of a person into electrical energy. Such motions may include sitting and standing. For example, a drive mechanism may be supported on a seating system that includes a seating article. When a user sits on the seating article or vacates the seating article, the drive mechanism powers an electrical generator and generates electrical energy. The resultant electrical energy can be stored in a battery or other electrical storage device to be used for a variety of functions.

The present invention enables an electrically powered seat to be wholly or partially self-powered. Consequently, the need for separate power cables and connectors is reduced or even eliminated. The energy harvesting mechanism—and any resistance offered by the mechanism—is relatively unnoticeable to a user. Finally, the mechanism is expected to require little, if any, maintenance.

These and other advantages and features of the invention will be more fully understood and appreciated by reference to the description of the current embodiments and the drawings.

DESCRIPTION OF THE CURRENT EMBODIMENTS

I. First Embodiment

Figure 1:
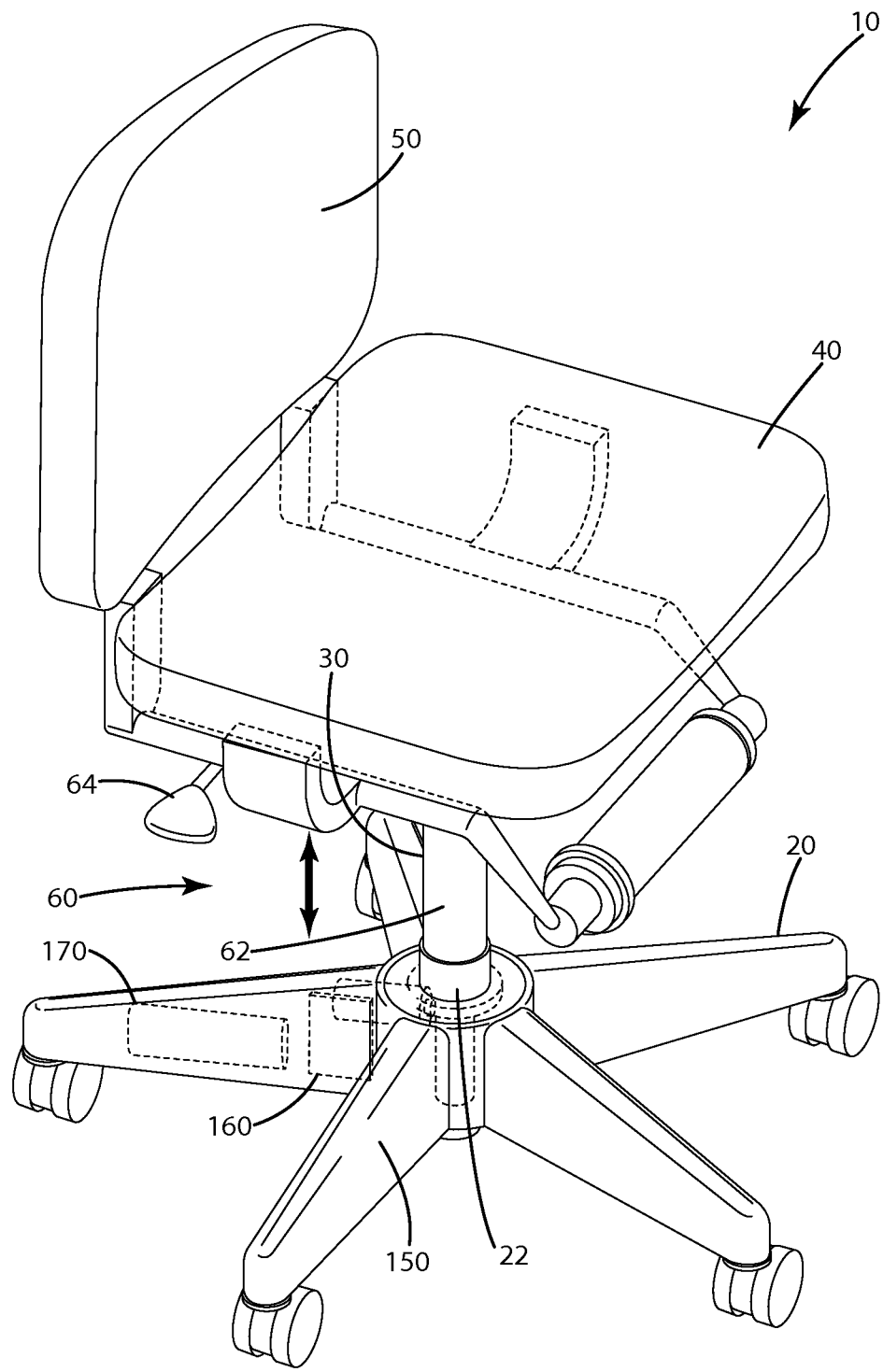
FIG. 1 is a perspective view of a chair incorporating a first embodiment of the invention.
Figure 2:
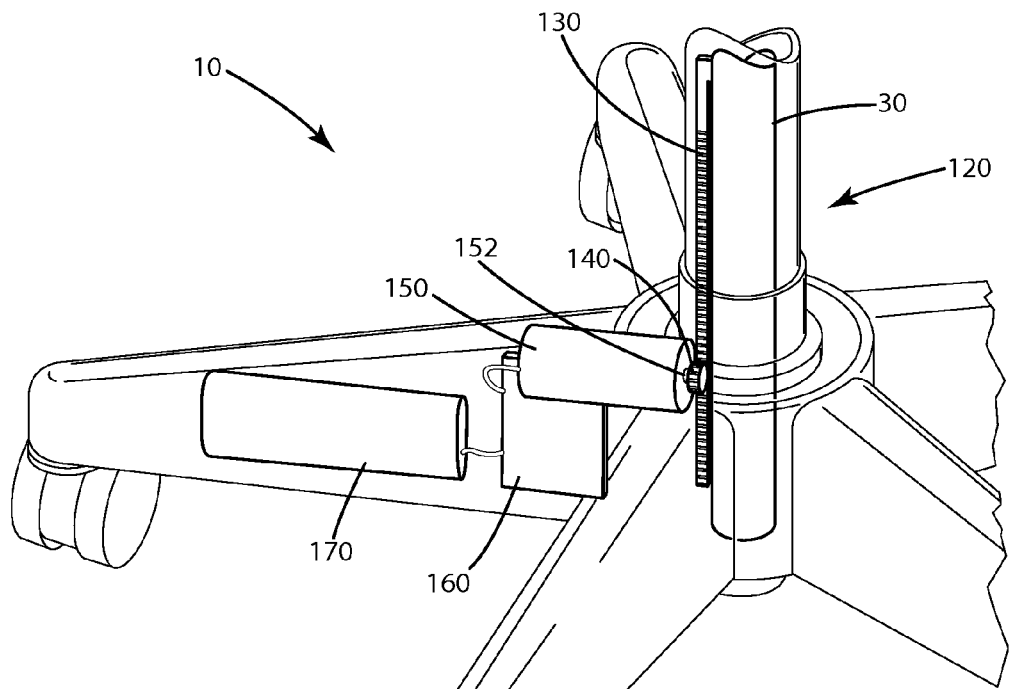
FIG. 2 is a perspective view of the first embodiment.
Figure 3:
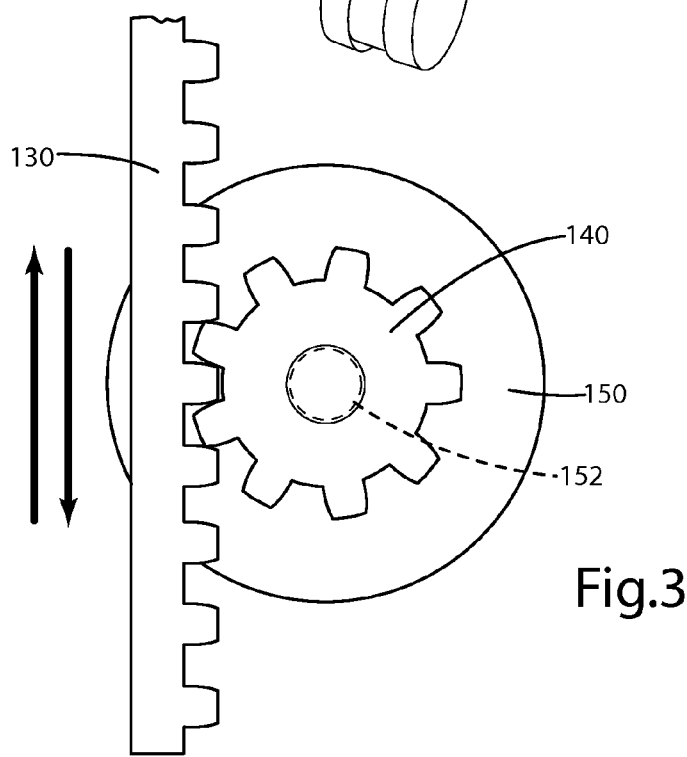
FIG. 3 is a front view of a rack gear, a pinion gear, and a generator.

An energy harvesting seating system constructed in accordance with a first embodiment of the present invention is illustrated in FIGS. 1-3 and generally designated 10. The seating system includes a plurality of legs 20 and a seating article, including a seat 40 and a seat back 50. The legs 20 meet at a hub 22. A column 30 extends upward from the hub 22. Seat 40 moves vertically with column 30. Seat back 50 is attached to seat 40 and extends generally upward from seat 40. Seating system 10 includes a seat height adjustment mechanism 60. Seat height adjustment mechanism 60 includes a cylinder 62 within column 30 to move the seat upward relative to the legs 20 when a user previously sitting in seat 40 vacates seat 40. Cylinder 62 may be powered by a spring, pneumatic or hydraulic piston, or any other means suitable for the application. Optionally, a user may use handle 64 to activate cylinder 62 and set an initial height for seat 40.

Seating system 10 includes a vertical energy harvesting system 120. Vertical energy harvesting system 120 includes a drive mechanism. The drive mechanism may be a drive gear or, more specifically, may be a rack gear 130 rigidly mounted to column 30. Optionally, rack gear 130 may be mounted to seat 40, seat back 50, or any other portion of the seating system that moves vertically with seat 40. Further optionally, rack gear 130 may be slidably mounted to column 30 such that rack gear 130 moves vertically with seat 40, but does not rotate with seat 40. A generator gear or pinion gear 140 is aligned with and engages rack gear 130. Pinion gear 140 is rigidly attached to a drive shaft 152 of a generator 150. The generator 150 may be an electrical generator. An enlarged view of the interaction between rack gear 130, pinion gear 140, and generator 150 is shown in FIG. 3. A circuit board 160 is electrically connected to generator 150. An energy storage device 170 is electrically connected to circuit board 160. Energy storage device 170 may include a battery, a capacitor, or any other device suitable to store electrical energy.

Figure 5:
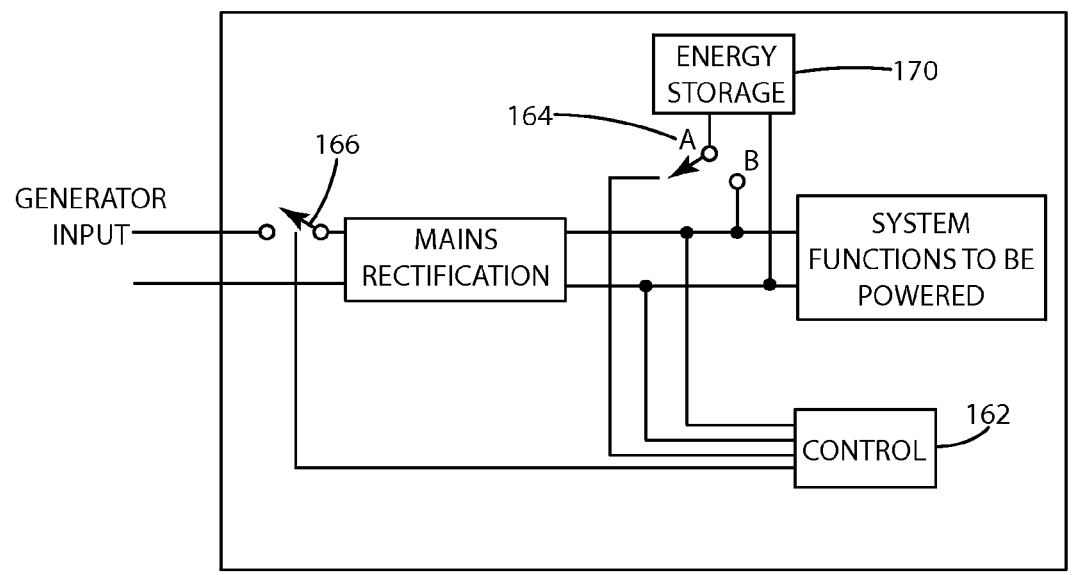
FIG. 5 is a diagram of a charging control circuit.

When seat 40 is vacant, cylinder 62 moves seat 40 upward relative to the legs until seat 40 reaches a predetermined height set by a user. This movement may be automatic or may be actuated manually by a user. As the user sits in seat 40, the mass of the user exerts a downward force on seat 40 that causes seat 40 to move downward relative to legs 20. The vertical travel of seat 40 may at first be noticeable to the user, but the user will likely become accustomed to the seat travel quickly through repeated uses of seating system 10. Column 30 and rack gear 130 move downward with seat 40. As rack gear 130 moves downward relative to legs 20, rack gear 130 rotates pinion gear 140. Pinion gear 140 turns drive shaft 152 and drives generator 150. Generator 150 generates and transmits electrical power to circuit board 160. Circuit board 160 includes a charging control circuit shown in FIG. 5 to convert the electrical power into a useable form to charge energy storage device 170. The electrical power is stored in energy storage device 170 until it is needed.

Figure 7:
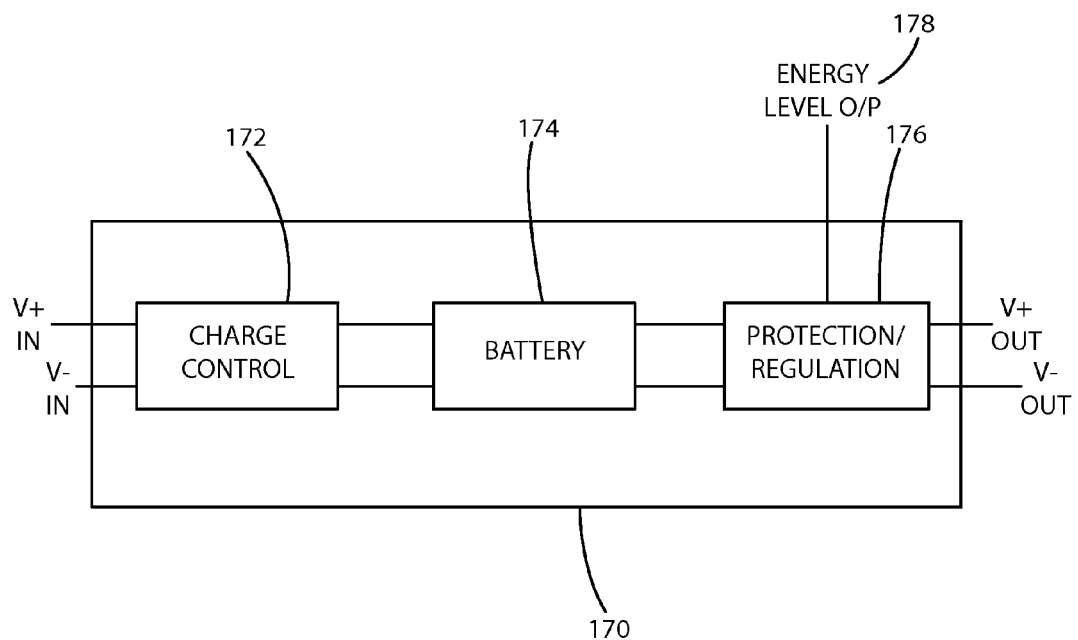
FIG. 7 is a diagram of a charge management, storage, and regulation circuit.

Energy storage device 170 may include a charge management, storage, and regulation circuit as shown in FIG. 7. A charge control device 172 is electrically connected to a battery 174. A capacitor or any other energy storage means suitable to the application may be used in place of battery 174. Charge control device 172 controls the amount of power conducted to battery 174. A protection/regulation device 176 is electrically connected to battery 174 and regulates the power output from battery 174. An energy level output 178 is electrically connected to protection/regulation device 176 and monitors the energy output level from energy storage device 170.

Returning to FIG. 5, once electrical power is required, control 162 moves switch 164 to position 164b and electrical power is transmitted from energy storage device 170 to the system that needs energy. Optionally, if there is insufficient power in energy storage device 170 to power the system, control 162 may close switch 166 and move switch 164 to position 164a, which will power the system directly from the generator 150. Further optionally, the generator 150 and energy storage device 170 may power functions related to seating system 10 including but not limited to heating or cooling the seat, sensing the presence of a person, powering seat actuators, balancing the seat, electronically tagging or labeling the seat, monitoring and/or displaying a person's heart rate or temperature, and monitoring the movement of the seat. When seat 40 is vacated, cylinder 62 moves seat 40 upward relative to the legs 20, until seat 40 reaches a predetermined height set by a user. Energy may be generated during the upward movement of seat 40 in a similar manner as described with regard to the downward movement of seat 40.

Figure 4:
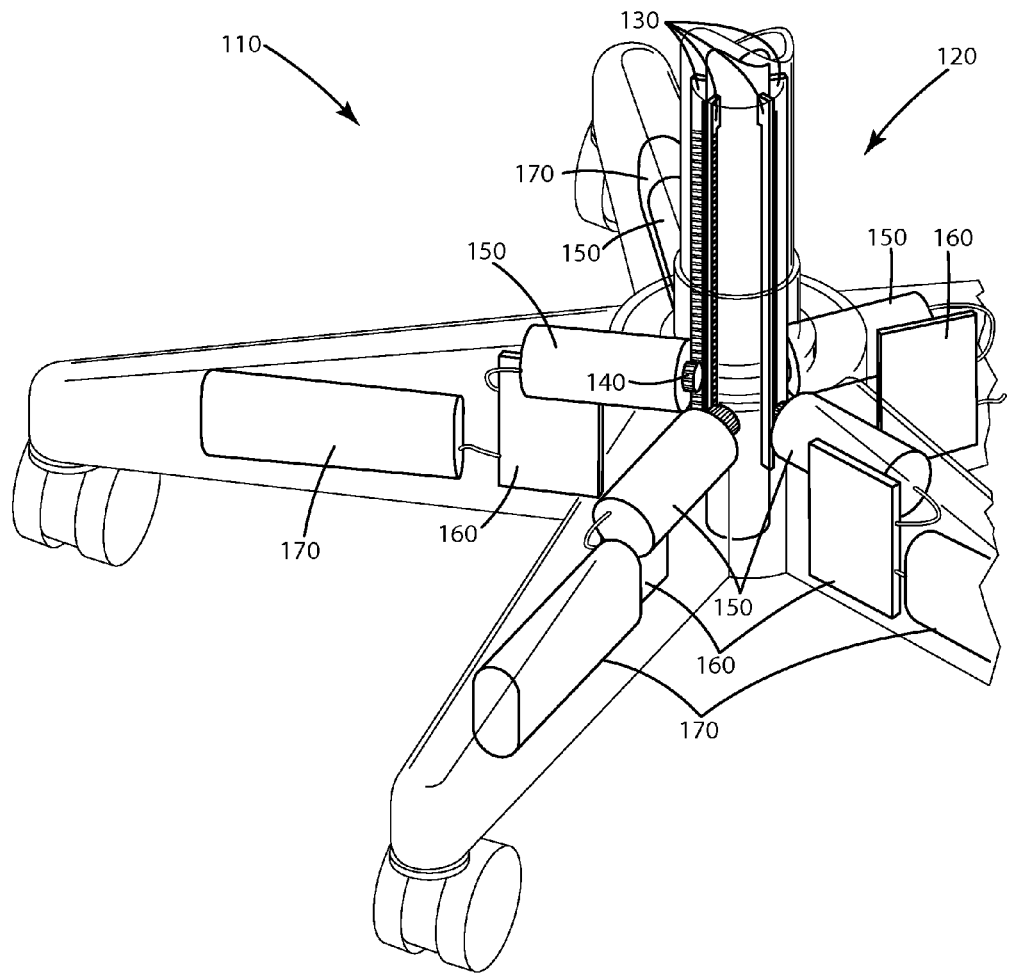
FIG. 4 is a perspective view of a variation of the first embodiment including multiple generators.

Optionally, as shown in FIG. 4, seating system 110 may include a vertical energy harvesting system 120 that includes a plurality of rack gears 130, a plurality of pinion gears 140, a plurality of generators 150, a plurality of circuit boards 160, and a plurality of energy storage devices 170. The energy harvesting system 120 having this configuration would function as described above. Further optionally, only one energy storage device 170 may be included. In this configuration, all circuit boards 160 from all generators 150 would be electrically connected to the single energy storage device 170 and all electrical power generated from all generators 150 would be stored in the energy storage device 170. Further optionally, one circuit board 160 and one energy storage device 170 may be included. In this configuration, all generators 150 would be electrically connected to the single circuit board 160, and circuit board 160 would be electrically connected to the energy storage device 170.

II. Second Embodiment

Figure 8:
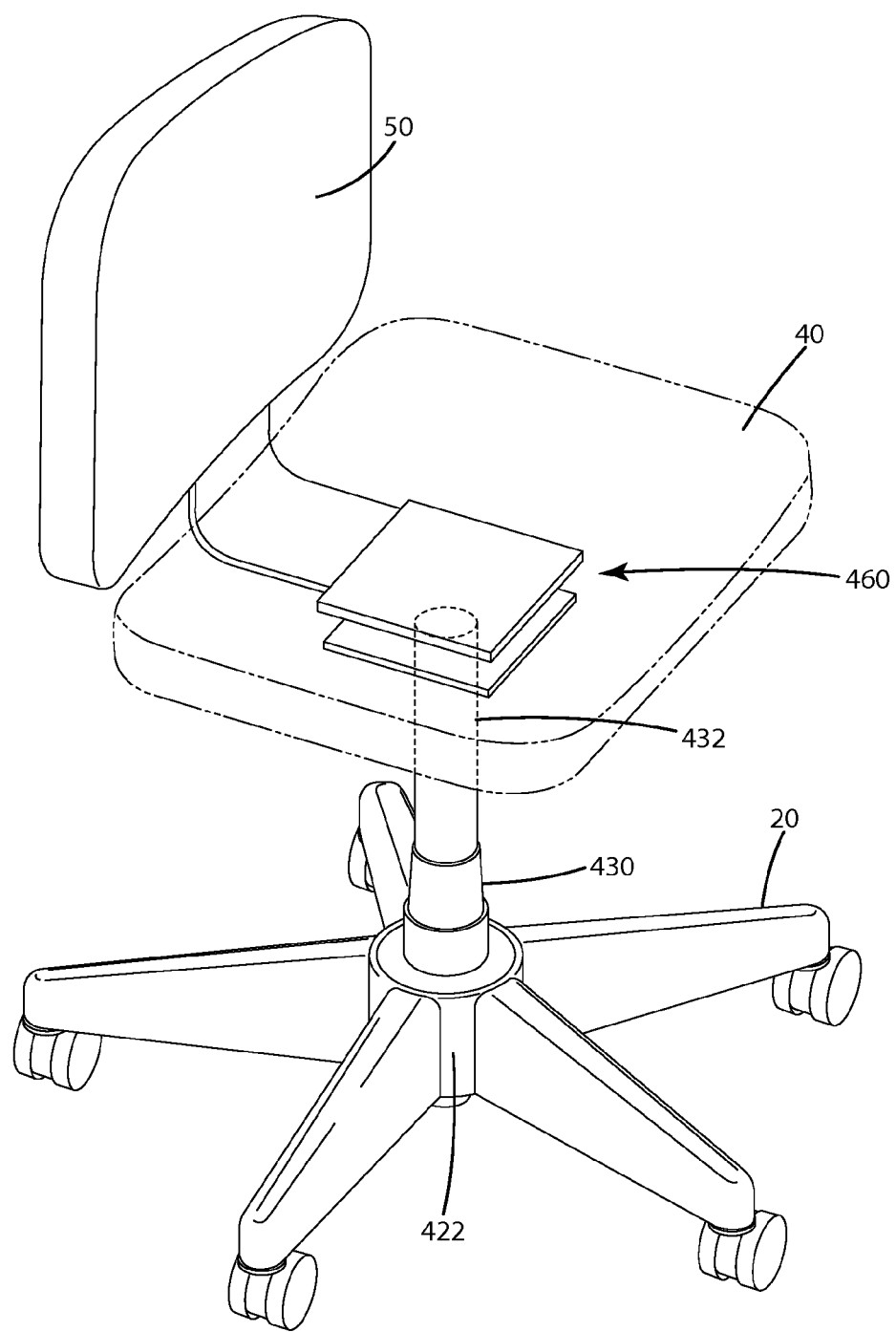
FIG. 8 is a perspective view of a chair illustrating an energy generation space.

An illustration of a seating system is shown in FIG. 8. The seating system includes a plurality of legs 20 and a seating article, including a seat 40 and a seat back 50. The legs 20 meet at a hub 422. A telescoping midsection 430 extends upward from legs 20 through hub 422. A cylinder 432 extends upward through telescoping midsection 430 to adjust the height of the seat. Cylinder 432 may be powered manually or automatically by pneumatics, hydraulics, springs, or by any other means suitable to the application. Cylinder 432 may rotate within telescoping midsection 430. Seat back 50 is attached to seat 40 and extends generally upward from seat 40. An energy generation space 460 is located between seat 40 and cylinder 432 in which the upward and/or downward movements of the seat 40 are used to generate energy. Energy generation space 460 will be described in more detail with regard to the various embodiments.

Figure 9:
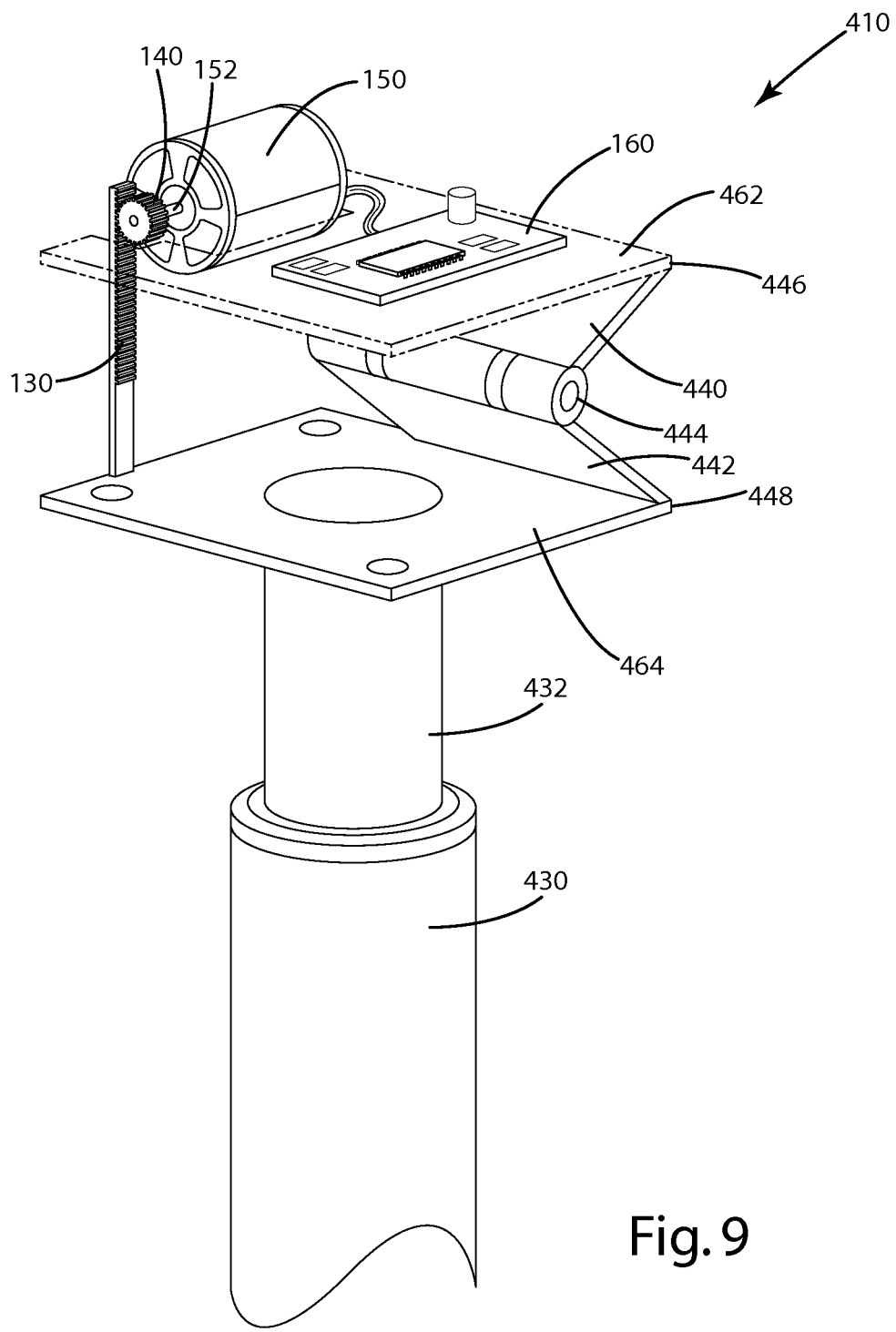
FIG. 9 is a perspective view of a second embodiment of the invention.

An energy harvesting system constructed in accordance with a second embodiment of the present invention is illustrated in FIG. 9 and generally designated 410. Energy harvesting system 410 is located within energy generation space 460 and includes a top plate 462 and a bottom plate 464. Top plate 462 moves vertically with seat 40 and bottom plate 464 remains stationary while seat 40 moves vertically. For example, top plate 462 may be mounted to or supported by seat 40 and bottom plate 464 may be mounted to or supported by cylinder 432 such that top plate 462 moves in at least the vertical direction with seat 40 while bottom plate 464 remains stationary in at least the vertical direction. Top plate 462 and bottom plate 464 are hingedly attached to angled plates 440, 442 with hinges 446, 448. Angled plates 440, 442 are attached to one another through hinge 444. Hinges 444, 446, 448 may be biased and/or impeded such that when no force is exerted on top plate 462, energy harvesting system 410 has the orientation shown in FIG. 9. Optionally, hinges 444, 446, 448 may be any flexible connection allowing angular motion including but not limited to deformable plastics or composites. Further optionally, hinges 444, 446, 448 may include springs that return the top plate 462 and bottom plate 464 to their pre-loaded orientation when seat 40 is vacated. Plates 462, 464 may move vertically relative to one another when a force is exerted on and/or removed from top plate 462. Rack gear 130 is mounted to bottom plate 464. Pinion gear 140 is aligned with and engages rack gear 130. Pinion gear 140 is rigidly attached to a drive shaft 152 of a generator 150. A circuit board 160 is electrically connected to generator 150. Optionally, with regard to all embodiments, circuit board 160 may be a printed circuit board. An energy storage device 170 is electrically connected to circuit board 160. As with all embodiments, the energy storage device 170 may include a battery, a capacitor, or any other device suitable to store electrical energy.

Figure 13:
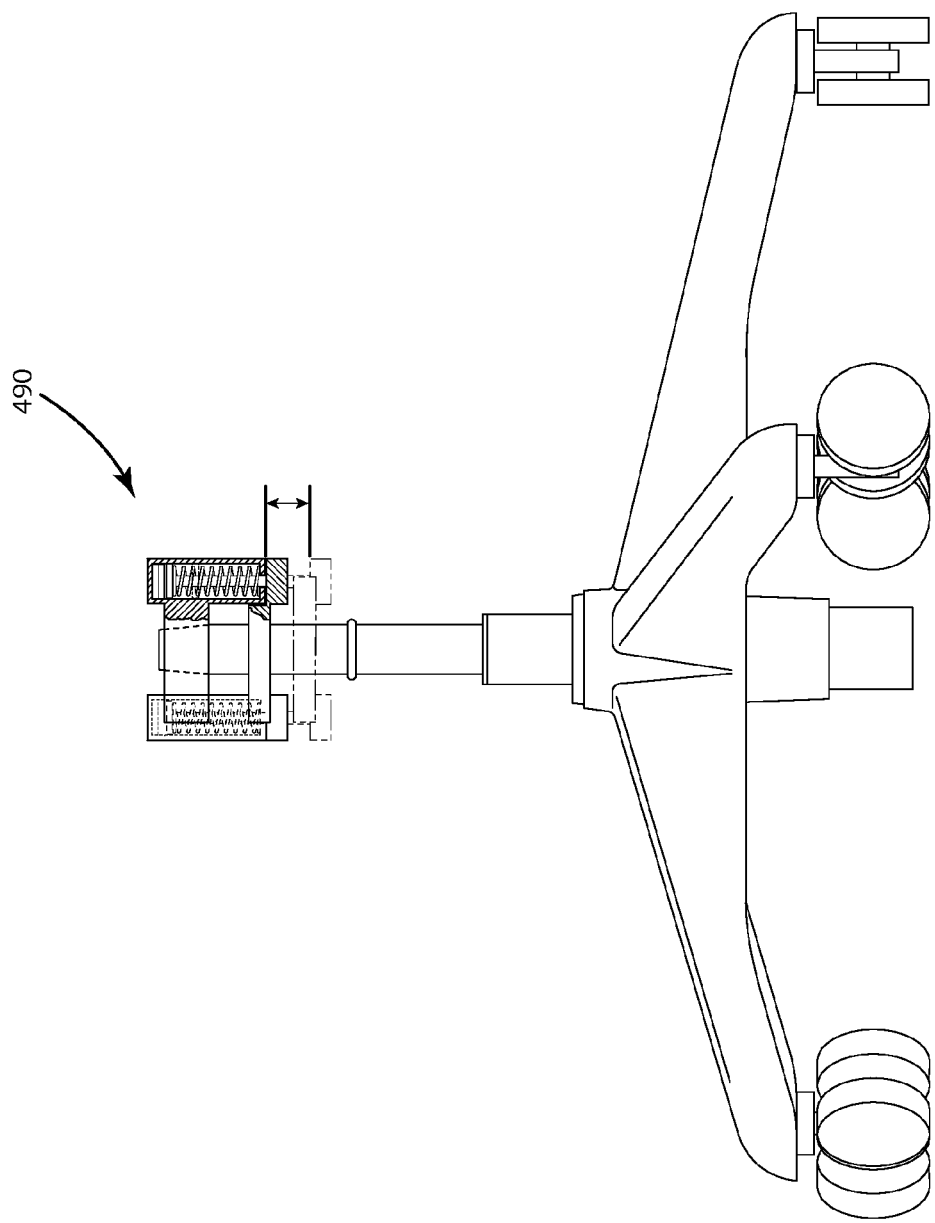
FIG. 13 is an exemplary front view of a spring design.
Figure 14:
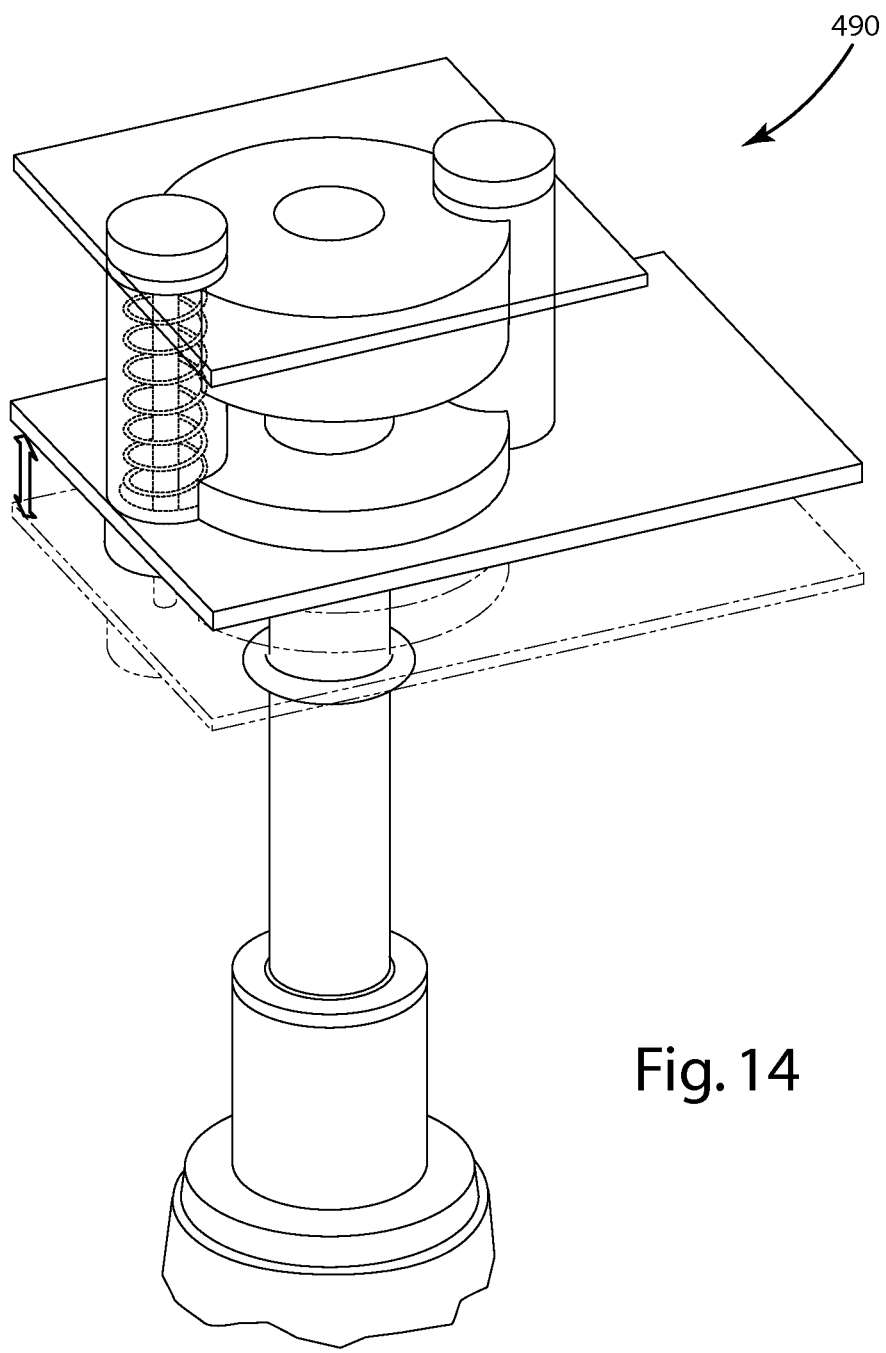
FIG. 14 is a perspective view of the spring design of FIG. 13.
Figure 15:
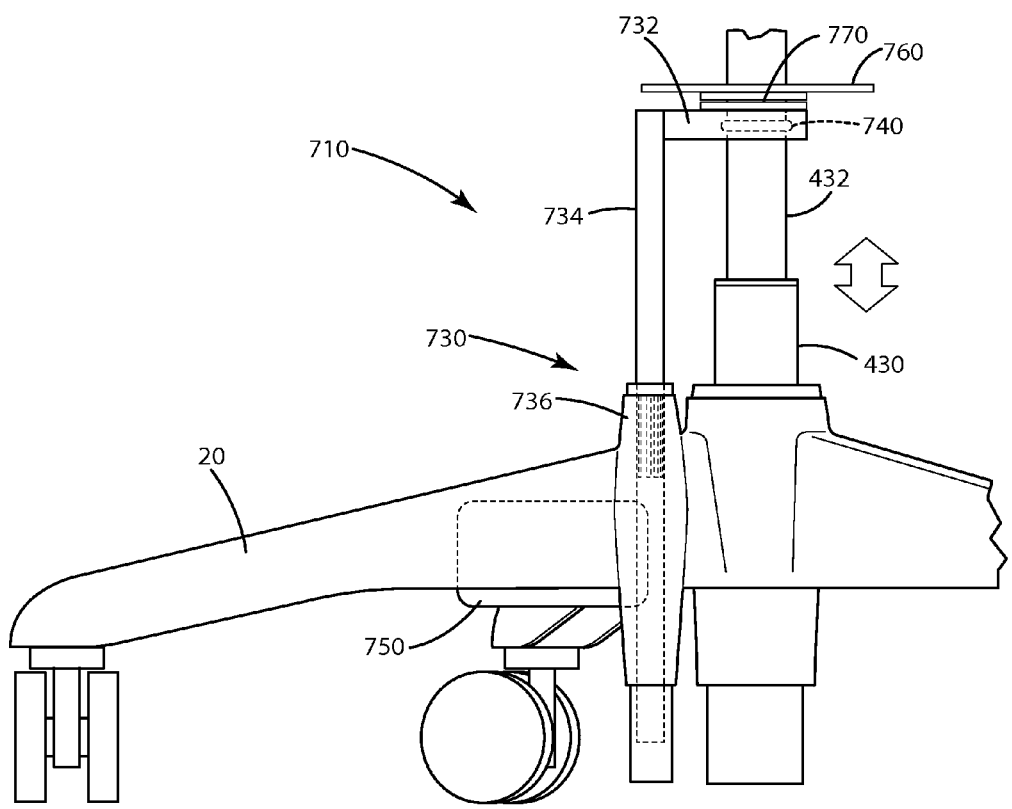
FIG. 15 is a front view of a fifth embodiment of the invention.
Figure 16:
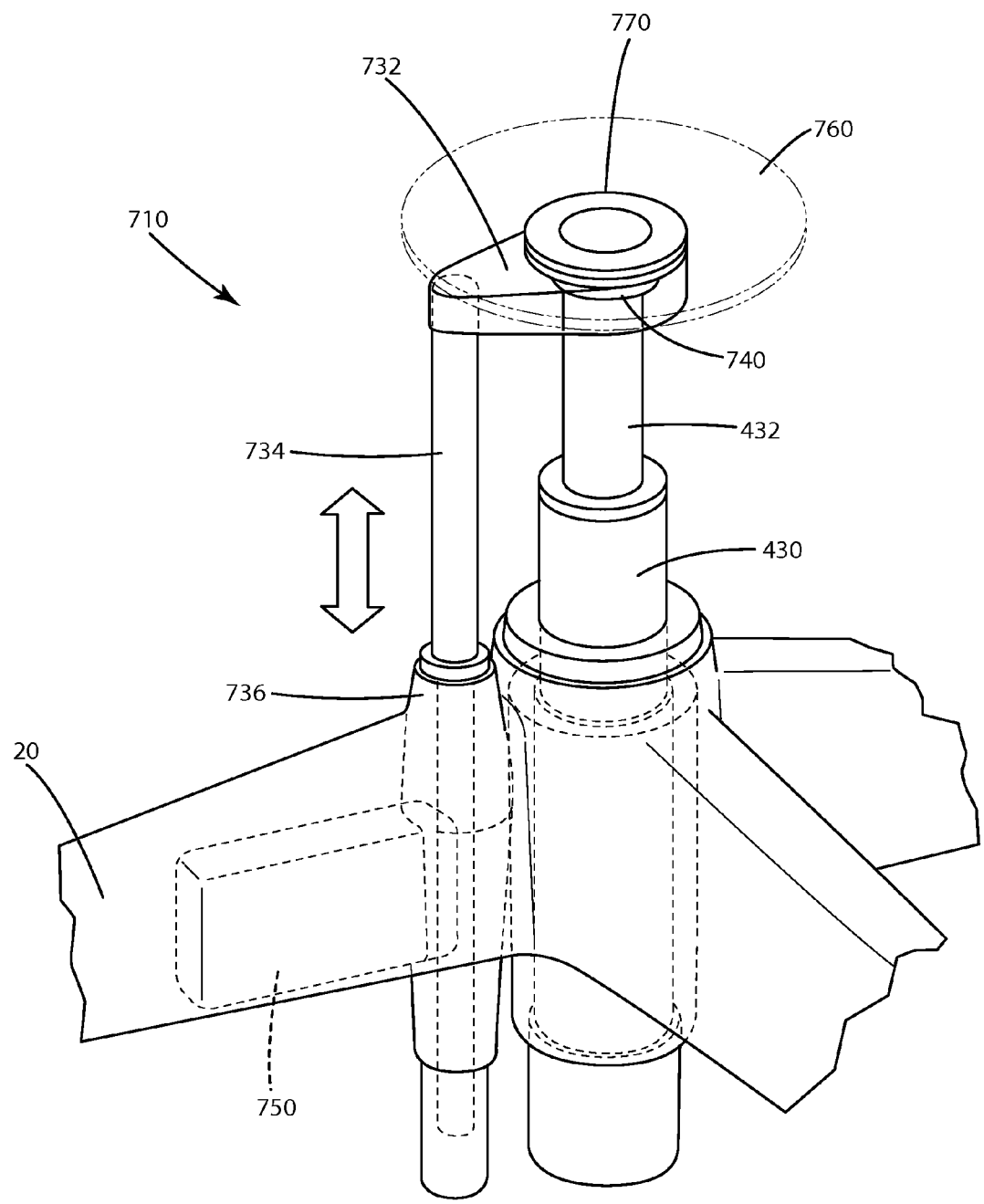
FIG. 16 is a perspective view of the fifth embodiment of the invention.

FIG. 9 shows the generator 150 and circuit board 160 mounted to the top of top plate 462, but alternate placements are considered, including but not limited to mounting the generator 150 and circuit board 160 to the bottom plate 464 and mounting the rack gear 130 to the top plate 462. Optionally, energy harvesting system 410 may include one or more guides that maintain a substantially parallel orientation between top plate 462 and bottom plate 464 during movement of the top plate 462 relative to the bottom plate 464. For example, the guide may be a post inserted through a bearing hole, or any other design suitable for the application. Further optionally, one or more springs, hydraulic pistons, or pneumatic pistons may be located between top plate 462 and bottom plate 464 to return the plates 462, 464 to their pre-loaded orientation when seat 40 is vacated. An exemplary spring orientation is shown in FIGS. 13-14 and generally designated 490. The guides, springs, and/or pistons may produce a more controlled vertical movement and reduce any wobbling of seat 40 while seat 40 is static or in motion.

When seat 40 is vacant, energy harvesting system 410 has the orientation shown in FIG. 9. In this orientation, the distance between top plate 462 and bottom plate 464 is at a maximum. As the user sits in seat 40, the mass of the user exerts a downward force on seat 40 that exerts a downward force on top plate 462. Hinges 444, 446, 448 flex under the downward force, allowing top plate 462 to move downward relative to bottom plate 464. As top plate 462 moves downward, rack gear 130 causes pinion gear 140 to rotate. Pinion gear 140 turns drive shaft 152 and drives generator 150. Generator 150 generates and transmits electrical power to circuit board 160. Circuit board 160 includes a charging control circuit shown in FIG. 5 to convert the electrical power into a useable form to charge energy storage device 170. The electrical power is stored in energy storage device 170 until it is needed. Energy storage device 170 may include a charge management, storage, and regulation circuit as shown in FIG. 7 and described with regard to the first embodiment. When seat 40 is vacated, top plate 462 is returned to its pre-loaded orientation with the means described above or any other means suitable for returning top plate 462 to its pre-loaded orientation. Energy may be generated during the upward movement of seat 40 in a similar manner as described with regard to the downward movement of seat 40.

As described with regard to the other embodiments, the energy harvesting system 410 may include a plurality of rack gears 130, pinion gears 140 and generators 150 that generate and store power separately or in a single energy storage device 170. Adding rack gears 130 to this embodiment may also stabilize the vertical movement of the seat 40 and reduce wobble.

III. Third Embodiment

Figure 10:
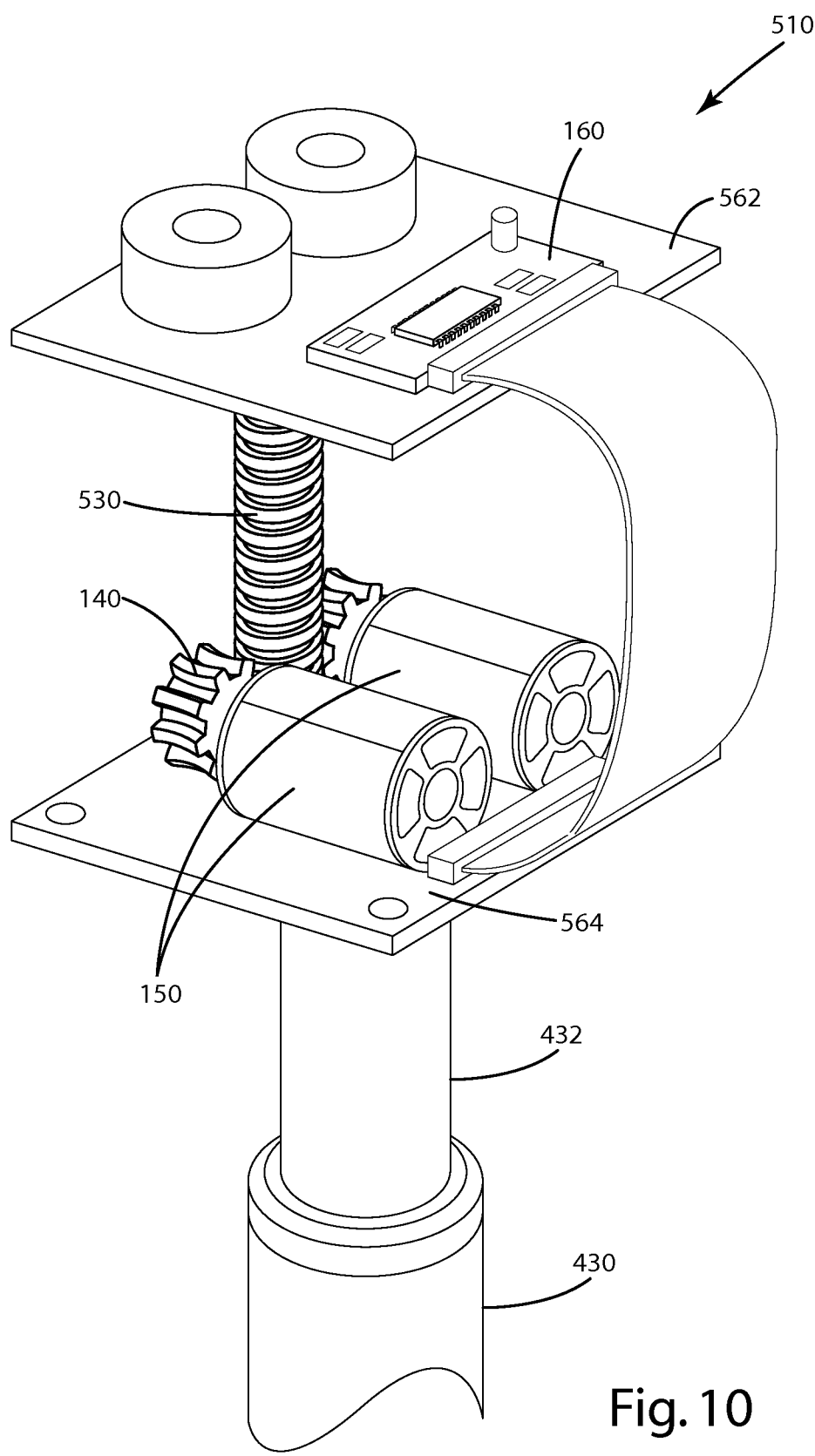
FIG. 10 is a perspective view of a third embodiment of the invention.

An energy harvesting system constructed in accordance with a third embodiment of the present invention is illustrated in FIG. 10 and generally designated 510. Energy harvesting system 510 is located within energy generation space 460 and includes a top plate 562 and a bottom plate 564. Top plate 562 moves vertically with seat 40, and bottom plate 564 remains stationary while seat 40 moves vertically. For example, top plate 562 may be mounted to or supported by seat 40 and bottom plate 564 may be mounted to or supported by cylinder 432 such that top plate 562 moves in at least the vertical direction with seat 40 while bottom plate 564 remains stationary in at least the vertical direction. Energy harvesting system 510 includes two generators 150 mounted to bottom plate 564. A pinion gear 140 is rigidly attached to each generator 150 with a drive shaft 152. Pinion gears 140 align and interact with a drive gear or notched post 530, which is mounted to top plate 562. A circuit board 160 is mounted to top plate 562 and electrically connected to generators 150. An energy storage device 170 is electrically connected to circuit board 160.

FIG. 10 shows generators 150 mounted to the top surface of bottom plate 564 and circuit board 160 mounted to the top surface of top plate 562, but alternate mounting locations are considered, including but not limited to mounting generators 150 to the bottom surface of bottom plate 564 or to a surface of top plate 562 and mounting notched post 530 to the bottom plate 564. Optionally, energy harvesting system 510 may include one or more guides, springs, and/or pistons described with regard to the second embodiment.

When seat 40 is vacant, energy harvesting system 510 has the orientation shown in FIG. 10. In this orientation, the distance between top plate 562 and bottom plate 564 is at a maximum. As the user sits in seat 40, the mass of the user exerts a downward force on seat 40 that exerts a downward force on top plate 562. As top plate 562 moves downward, notched post 530 moves downward, causing pinion gears 140 to rotate. Pinion gears 140 turn drive shafts 152 and drive generators 150. Generators 150 generate and transmit electrical power to circuit board 160. Circuit board 160 includes a charging control circuit shown in FIG. 5 and described with regard to the first embodiment to convert the electrical power into a useable form to charge energy storage device 170. The electrical power is stored in energy storage device 170 until it is needed. Energy storage device 170 may include a charge management, storage, and regulation circuit as shown in FIG. 7 and described with regard to the first embodiment. When seat 40 is vacated, top plate 562 is returned to its pre-loaded orientation by the means described above or any other means suitable for returning top plate 562 to its pre-loaded orientation. Energy may be generated during the upward movement of seat 40 in a similar manner as described with regard to the downward movement of seat 40.

As described with regard to the other embodiments, the energy harvesting system 510 may include a plurality of notched posts 530, pinion gears 140 and generators 150 that generate and store power separately or in a single energy storage device 170. Adding notched posts 530 to this embodiment may also stabilize the vertical movement of the seat 40 and reduce wobble.

IV. Fourth Embodiment

Figure 11:
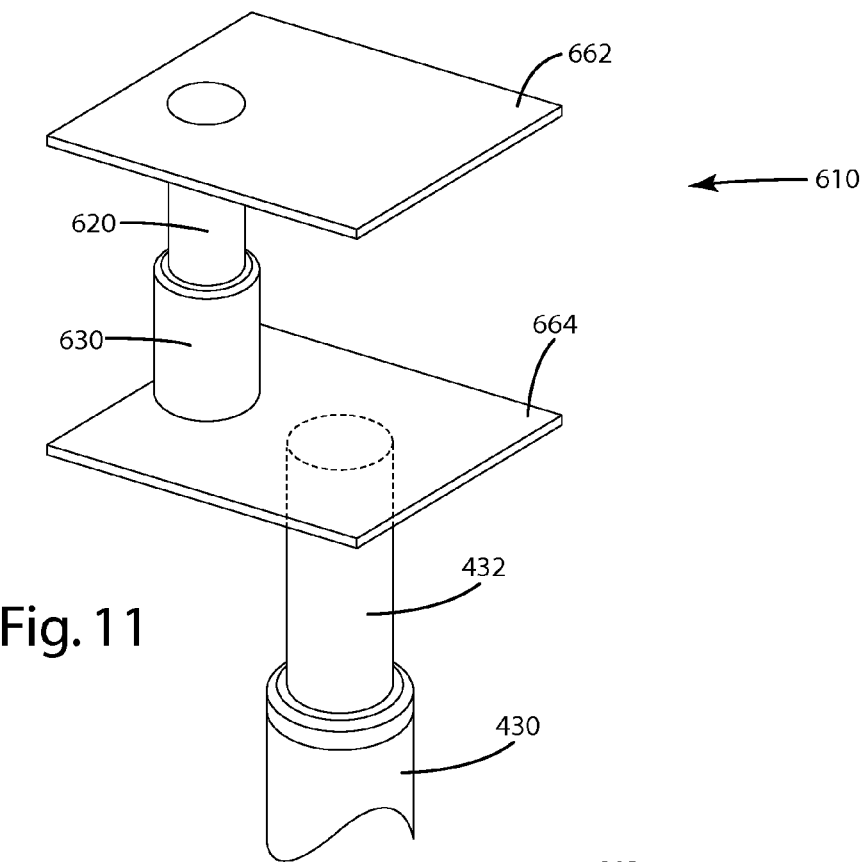
FIG. 11 is a perspective view of a fourth embodiment of the invention.
Figure 12:
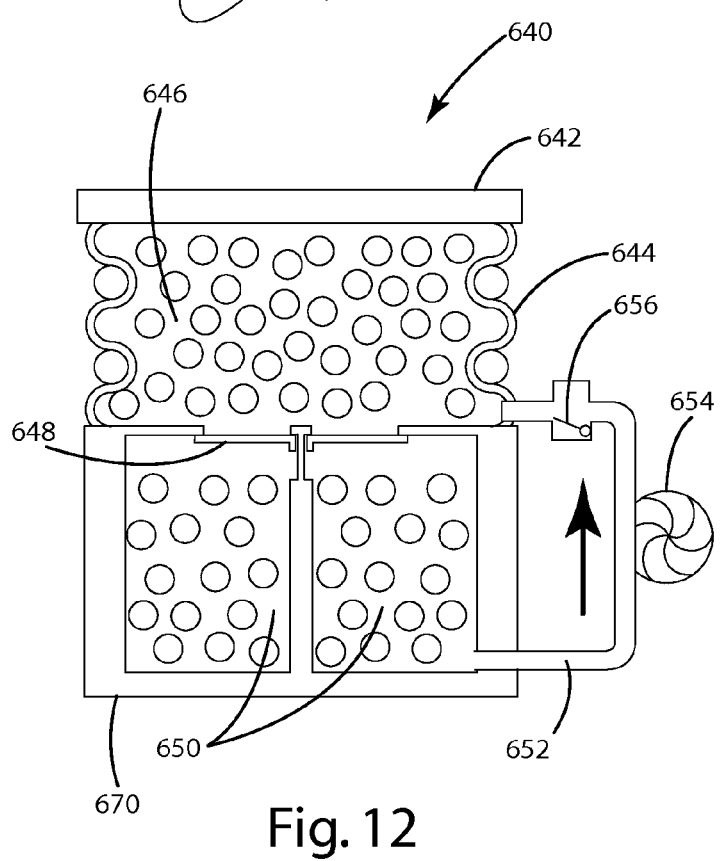
FIG. 12 is a front view of an energy generation device in the fourth embodiment.

An energy harvesting system constructed in accordance with a fourth embodiment of the present invention is illustrated in FIGS. 11 and 12 and generally designated 610. Energy harvesting system 610 is located within energy generation space 460 and includes a top surface or top plate 662 and a bottom surface or bottom plate 664. Top plate 662 moves vertically with seat 40 and bottom plate 664 remains vertically stationary. A top cylinder 620 is rigidly attached to the bottom surface of top plate 662 and extends downward from top plate 662. A bottom cylinder 630 is rigidly attached to the top surface of bottom plate 664 and receives top cylinder 620, as shown in FIG. 11. Energy generation device 640 is located within bottom cylinder 630 and is shown in FIG. 12.

Figure 12A:
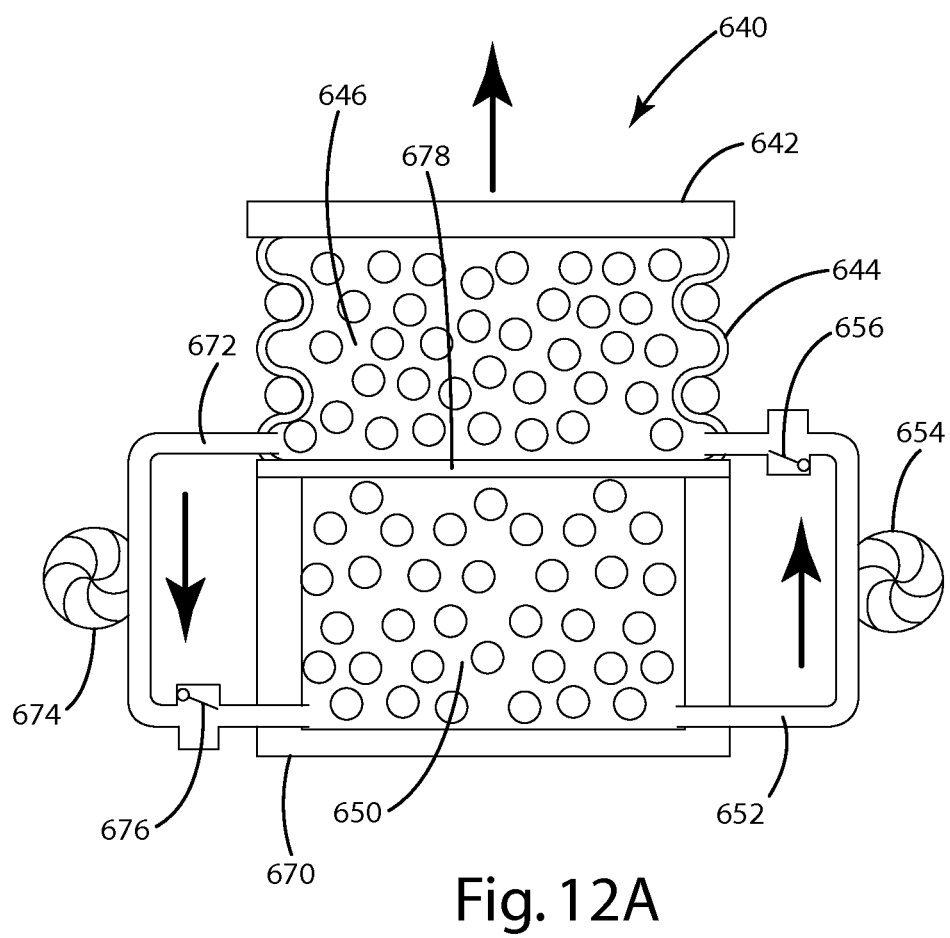
FIG. 12A is a front view of a variation of an energy generation device in the fourth embodiment.

The bottom surface 642 of top cylinder 620 may be attached to energy generation device 640. This attachment may be flexible, as shown by the flexible sides 644 in FIG. 12. Optionally, the attachment may be slidable such that sides 644 are rigid and slide past the sides of the bottom chamber 650. Energy generation device 640 includes a top chamber 646, a bottom chamber 650, and a turbine 654. Top chamber 646 and bottom chamber 650 include fluid and are connected. A one-way chamber valve 648 is positioned between top chamber 646 and bottom chamber 650. The one-way chamber valve 648 allows fluid flow from the top chamber 646 to the bottom chamber 650, but prohibits fluid flow from the bottom chamber 650 to the top chamber 646. The fluid may be any fluid suitable for the application, including liquids and/or gases. A tube 652 connects the bottom chamber 650 to the top chamber 646. A one-way turbine valve 656 is positioned between top chamber 646 and bottom chamber 650. The one-way turbine valve 656 allows fluid flow from bottom chamber 650 to top chamber 646, but prohibits fluid flow from top chamber 646 to bottom chamber 650. Turbine 654 is located adjacent to and within tube 652 such that fluid flowing through tube 652 will cause the blades of turbine 654 to rotate. Turbine 654 includes a generator 150 and is electrically connected to a circuit board 160 and an energy storage device 170. Optionally, energy harvesting system 610 may include one or more guides, springs, and/or pistons described with regard to the second embodiment. Further optionally, energy generation device 640 may attach anywhere in top cylinder 620 or bottom cylinder 630 that allows energy generation during the vertical travel of seat 40. For example, the top of energy generation device 640 may be attached to the bottom surface of top plate 662 and the bottom surface 670 of energy generation device 640 may be attached to the top of bottom plate 664. Further optionally, energy generation device 640 may include two or more turbines 654, 674, as shown in FIG. 12A. This configuration may allow energy harvesting during both the upward and downward movement of seat 40.

When seat 40 is vacant, energy harvesting system 610 has the orientation shown in FIG. 11. In this orientation, the distance between top plate 662 and bottom plate 664 is at a maximum. As the user sits in seat 40, the mass of the user exerts a downward force on seat 40 that exerts a downward force on top plate 662. As top plate 662 moves downward, top cylinder 620 moves downward relative to bottom cylinder 630. The bottom surface 642 of top cylinder 620 moves downward, compressing the fluid in top chamber 646. The compressed fluid in top chamber 646 forces one-way chamber valve 648 to open and allow fluid to flow from the top chamber 646 to the bottom chamber 650, which creates compressed fluid in bottom chamber 650 and tube 652. Energy generation device 640 remains in this compressed orientation until the user vacates seat 40. Once the user vacates seat 40 and the downward force is removed from top plate 662, the pressure in top chamber 646 is reduced, which causes fluid to flow from bottom chamber 650 to top chamber 646 through tube 652. As the fluid flows through tube 652, the blades of turbine 654 rotate, which generates and transmits electrical power to circuit board 160. Circuit board 160 includes a charging control circuit shown in FIG. 5 to convert the electrical power into a useable form to charge energy storage device 170. The electrical power is stored in energy storage device 170 until it is needed. Energy storage device 170 may include a charge management, storage, and regulation circuit as shown in FIG. 7 and described with regard to the first embodiment.

In the two-turbine configuration shown in FIG. 12A, energy may be generated during both the upward and downward travel of seat 40. Top chamber 646 is separated from bottom chamber 650 by chamber wall 678. As the user sits in seat 40, top plate 662 moves downward and the fluid in top chamber 646 is forced into secondary tube 672. The fluid flows past secondary turbine 674, which generates energy as described above with regard to the upward movement of seat 40. The fluid flows through one-way secondary turbine valve 676 and into bottom chamber 650. Energy generation device 640 remains in this compressed orientation until the user vacates seat 40. Once the downward force is removed from top plate 662, the seat 40 moves upward and energy is generated as described above.

As described with regard to the other embodiments, the energy harvesting system 610 may include a plurality of top cylinders 620, bottom cylinders 630, and energy generation devices 640 that generate and store power separately or in a single energy storage device 170. Adding top cylinders 620 and bottom cylinders 630 to this embodiment may also stabilize the vertical movement of the seat 40 and reduce wobble.

V. Fifth Embodiment

An energy harvesting system constructed in accordance with a fifth embodiment of the present invention is illustrated in FIGS. 15-18 and generally designated 710. Energy harvesting system 710 includes a plunger 730, an energy generation device 750, and a rotation disk 760. Plunger 730 includes a plunger head 732, a plunger shaft 734, and a plunger sleeve 736. Plunger head 732 engages a rib 740 on cylinder 432 such that plunger head 732 moves vertically with cylinder 432. In this embodiment, cylinder 432 may be adapted to move vertically with seat 40. Seat 40 is attached to rotation disk 760, which generally supports seat 40 and allows seat 40 to rotate relative to cylinder 432 and plunger 730, while moving vertically with cylinder 432. Plunger shaft 734 is rigidly attached to plunger head 732 and moves vertically with plunger head 732 and seat 40. Plunger sleeve 736 is rigidly mounted to leg 20 and surrounds plunger shaft 734, which allows plunger shaft 734 to move relative to plunger sleeve 736 during vertical movement of the seat 40. In other words, plunger sleeve 736 remains vertically stationary during movement of seat 40. Optionally, plunger sleeve 736 may be mounted to any suitable location that remains stationary during movement of the seat 40. Energy generation device 750 may be attached to, supported by or integrated with plunger sleeve 736. Energy generation device 750 may function in any of the ways described with regard to the other embodiments or in any way suitable for energy generation. For example, plunger shaft 734 may be ribbed or notched so that as plunger shaft 734 moves downward, the ribs rotate a pinion gear that is attached to a generator. As another example, energy generation device 750 may include a flexible cable that is attached to the plunger shaft 734 at one end and wrapped around a drive shaft of a generator at the other end. In this example, the flexible cable would wrap and unwrap from the drive shaft during vertical movement of the seat, thereby driving the generator. Optionally, any means suitable for generating power may be used.

Energy generation device 750 may be electrically connected to a circuit board 160 and an energy storage device 170. The seating system may be adapted to transfer power from the energy generation device 750 to seat 40 or seat back 50 using conductive and/or inductive power transfer. For example, the energy storage device 170 may be electrically connected to other parts of seat 40 with wires run through the plunger shaft 734 to the plunger head 732. The wires may connect to electrical contacts 770, which are able to transmit electrical power to seat 40 while allowing seat 40 to rotate relative to cylinder 432. For example, electrical contacts 770 may use inductive power transfer, conduction, or any other means suitable for the application. Additional wiring may electrically connect the seat 40 with various other locations.

As a user sits in seat 40, the mass of the user exerts a downward force on seat 40 that exerts a downward force on cylinder 432. As cylinder 432 moves downward, plunger head 732 and plunger shaft 734 move downward relative to plunger sleeve 736. As plunger shaft 734 moves relative to plunger sleeve 736, energy generation device 750 generates and transmits power to circuit board 160. Circuit board 160 includes a charging control circuit shown in FIG. 5 to convert the electrical power into a useable form to charge energy storage device 170. The electrical power is stored in energy storage device 170 until it is needed. Energy storage device 170 may include a charge management, storage, and regulation circuit as shown in FIG. 7 and described with regard to the first embodiment. As with other embodiments, when seat 40 is vacated, cylinder 432 may return the seat to its original preload height with pneumatics, hydraulics, springs or any other means suitable for the application. Energy may be generated during the upward movement of seat 40 in a similar manner as described with regard to the downward movement of seat 40.

Figure 17:
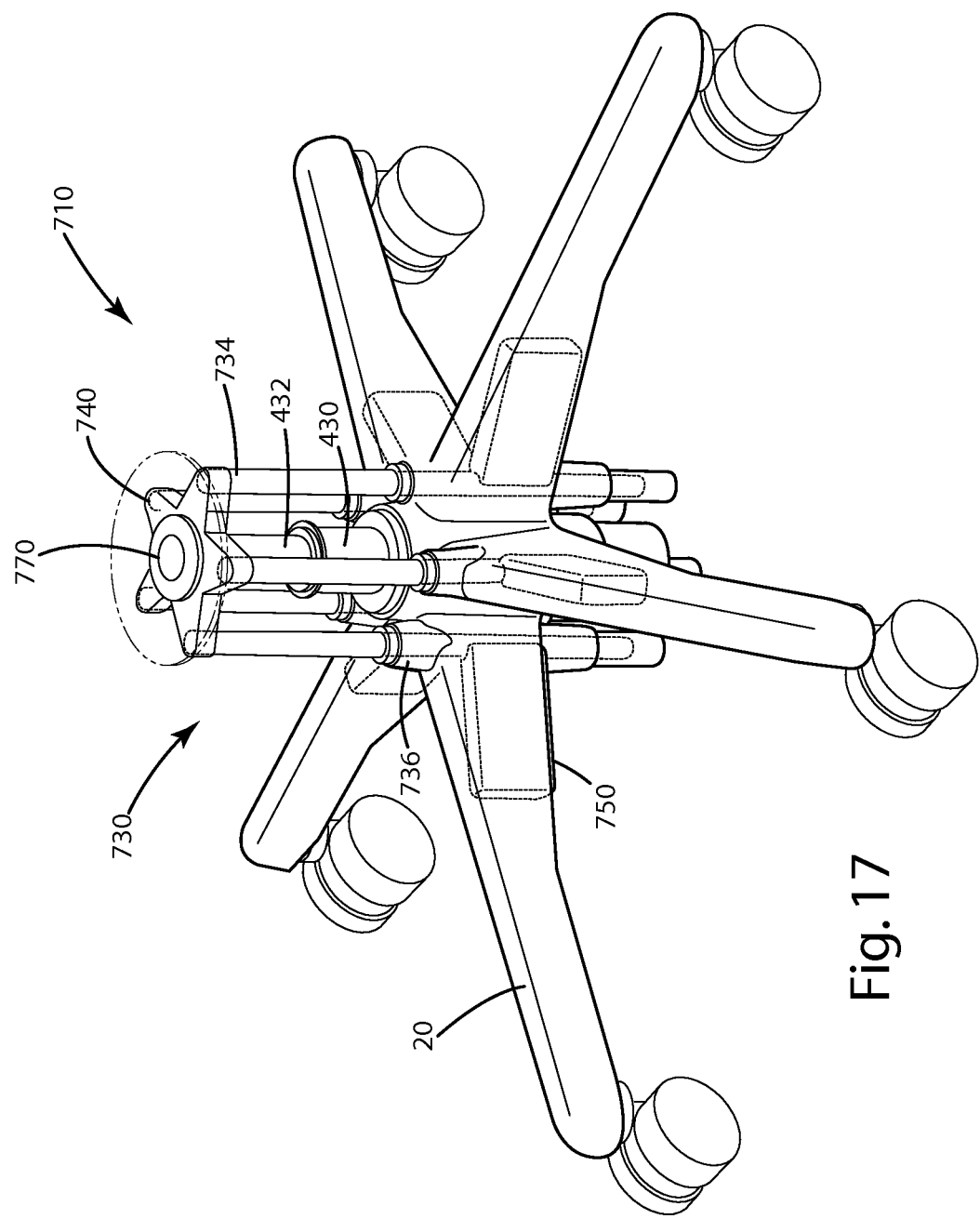
FIG. 17 is a perspective view of a variation of the fifth embodiment including multiple energy generation devices.
Figure 18:
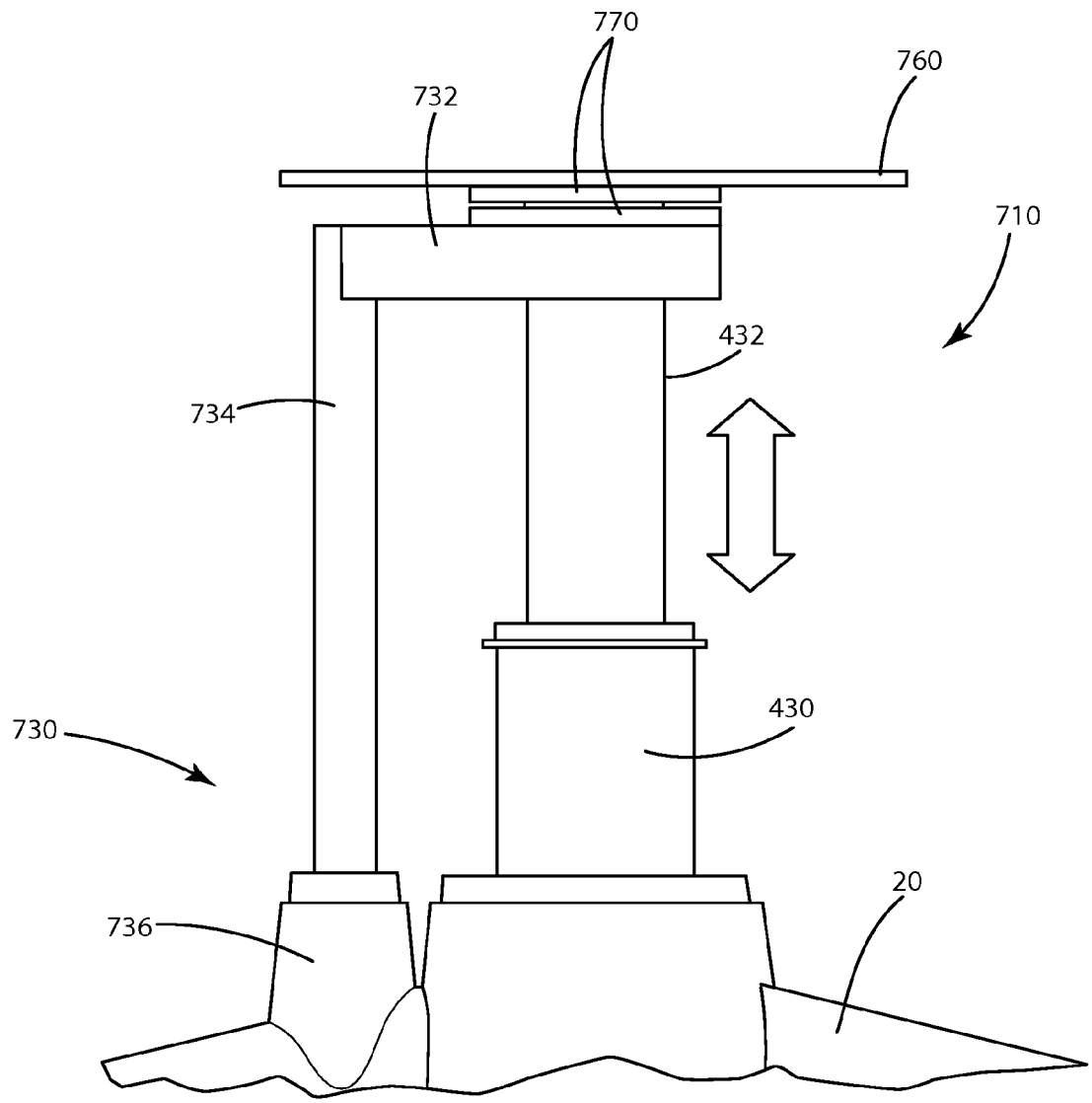
FIG. 18 is an enlarged front view of the fifth embodiment.

Optionally, as shown in FIG. 17, energy harvesting system 710 may include multiple plungers 730 interacting with cylinder 432 through plunger head 732. As with the other embodiments, this configuration may include a separate circuit board 160 and energy storage device 170 for each energy generation device 750, or one circuit board 160 and energy storage device 170 for all of the energy generation devices 750.

VI. Sleep/Awake State

Figure 6:
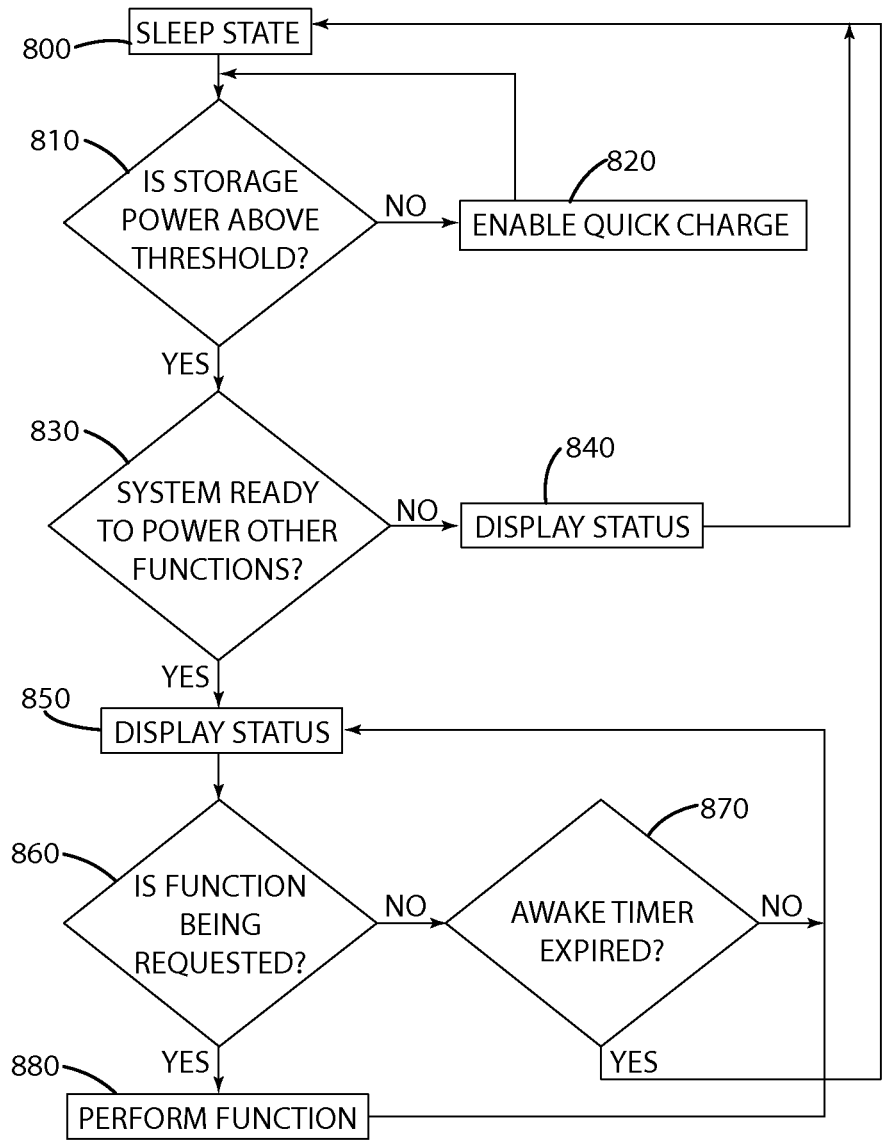
FIG. 6 is an operational flow chart.

An operational flow chart for the embodiments of the present invention including a sleep state and an awake state is illustrated in FIG. 6. After a predetermined time with no power requested from energy storage device 170, the system of the current embodiment will transition into a low-power sleep state 800. The system will continuously check whether the amount of power stored in energy storage device 170 is above the threshold to power a function 810. If the power is below the power threshold, a quick charge is enabled 820 and the system returns to determining the amount of power in energy storage device 170. If the power is above the power threshold, the system checks whether the system is ready to power other functions 830. If the system is not ready to power other functions, the system will display the status 840 and the system returns to sleep state 800. If the system is ready to power other functions, the system will display the status 850, and the system will check whether a function is being requested 860. If a function is being requested, the system will perform the function 880 and then display its current status 850. If a function is not being requested, the system will check whether the awake timer for the system has expired 870. If the awake timer has expired, the system will return to sleep state 800. If the awake timer has not expired, the system will display the current status 850.

The above descriptions are those of the current embodiments of the invention. Various alterations and changes can be made without departing from the spirit and broader aspects of the invention as defined in the appended claims, which are to be interpreted in accordance with the principles of patent law, including the doctrine of equivalents.

The invention claimed is:

1. A seating system comprising:
   a seat movable vertically under the weight of an occupant, the seat including at least one of an electrically powered seat adjustment motor, an electrically powered seat lumbar support, an electrically powered seat heating apparatus, and an electrically powered seat cooling apparatus;
   a bottom plate adapted to be supported on a seat support;
   a top plate supporting the seat;
   a first angled plate hingedly attached to the top plate;
   a second angled plate hingedly attached to the bottom plate and to the first angled plate, the top plate movable vertically with respect to the bottom plate;
   an electric generator supported by the top plate;
   a drive mechanism operatively connecting the seat and the generator, the drive mechanism adapted to drive the generator during vertical movement of the seat, the drive mechanism including a rack gear supported by the bottom plate, the generator including a pinion gear engaging the rack gear, the rack gear driving the pinion gear during the vertical movement of the seat; and
   the electric generator being electrically connected to the at least one of the seat adjustment motor, the seat lumbar support, the seat heating apparatus, and the seat cooling apparatus.

2. The seating system of claim 1 further comprising an electric motor receiving power from the electric generator to provide powered seat functions.

3. The seating system of claim 2 wherein the seating system is adapted to transfer power from the electric generator to the electric motor by way of at least one of inductive power transfer and conductive power transfer.

* * * * *